July 7, 1942.  U. L. SMITH  2,289,148
DYNAMOMETER MECHANISM
Filed Oct. 7, 1939
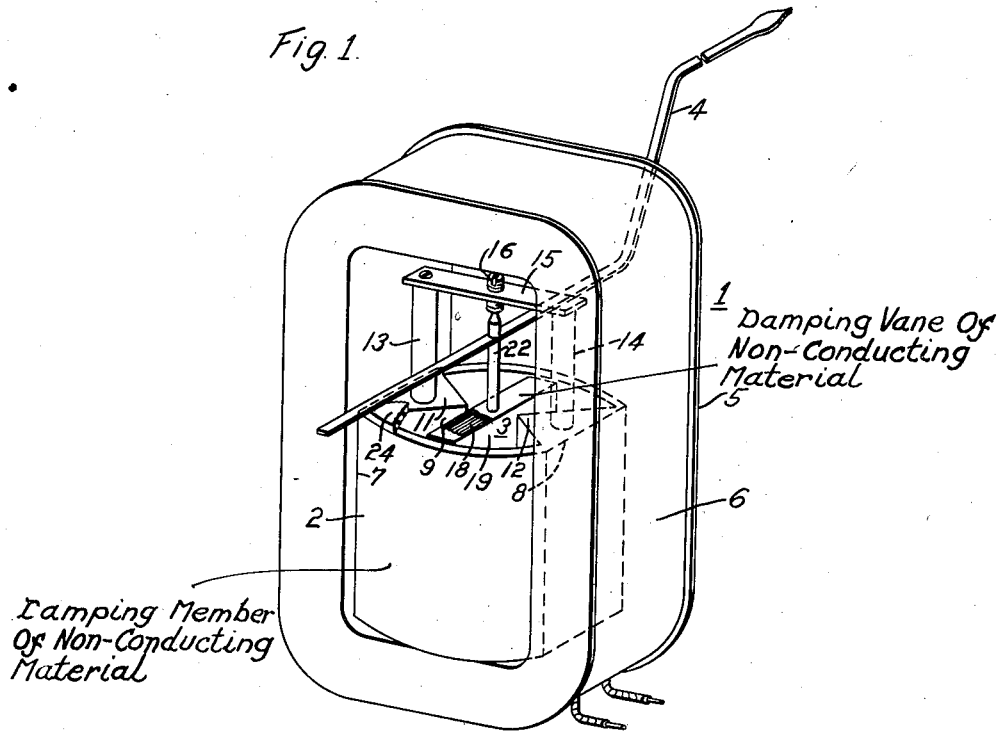
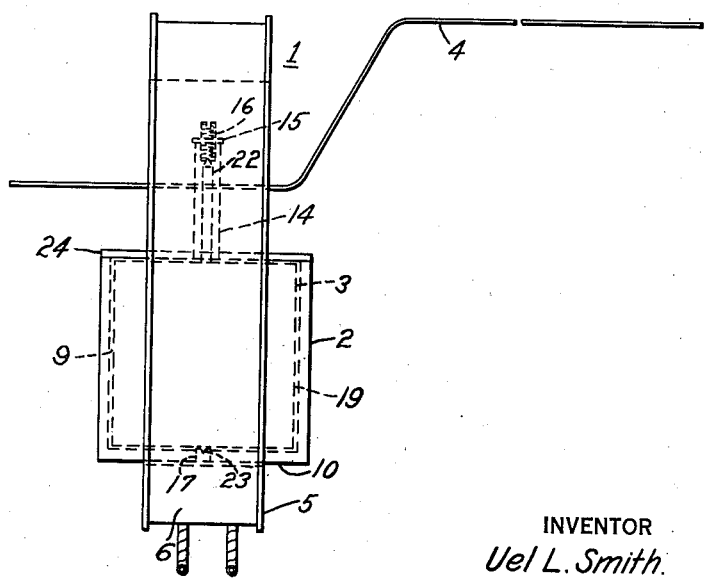
WITNESSES:
INVENTOR
Uel L. Smith.
BY
ATTORNEY Patented July 7, 1942

2,289,148

UNITED STATES PATENT OFFICE 2,289,148

DYNAMOMETER MECHANISM

Uel L. Smith, Morris Plains, N. J., assignor to Westinghouse Electric & Manufacturing Company, East Pittsburgh, Pa., a corporation of Pennsylvania Application October 7, 1939, Serial No. 298,454

1 Claim. (Cl. 171—95)

My invention relates to electrical measuring instruments and it has particular relation to damping means for instruments of the dynamometer type.

The dynamometer type instrument, as is well known, comprises a movable current carrying coil located within a stationary coil or coils and acted upon by the field thereof. In the majority of these instruments the natural damping characteristics are insufficient and added equipment is required for satisfactory damping operation. Among the damping methods taught by the prior art is the provision of a vane of some light material, such as aluminum, which is connected to the moving system and placed in an enclosed damping chamber. Another system of air damping employs a plunger carried by the moving coil and movable in a closed tube. Electromagnetic means have also been employed for this purpose.

In all these cases, however, the damping mechanism is an added piece of equipment and has no function other than to damp the moving element. These damping parts are added externally to the instrument coils and thus add considerably to the height or width of the mechanism as well as to the weight of the moving element. The added weight obviously, means greater wear on the bearing members and thus a shorter period of accurate service from the instrument.

I have invented an improved damping arrangement wherein the moving coil functions as a damping vane and thus the entire damping mechanism is built inside the stationary coil.

It is, therefore, an object of my invention to provide a moving coil type electrical instrument wherein the moving coil itself functions as a damping element.

It is another object of my invention to provide a moving coil type electrical instrument wherein the moving coil is confined in an enclosed chamber in such manner that it acts as a damping vane.

More specifically it is an object of my invention to provide a dynamometer type instrument in which the moving coil is confined in an enclosed chamber in such manner that a damping means exterior to the instrument movement is rendered unnecessary.

Other objects of my invention will become evident from the following detailed description, taken in conjunction with the accompanying drawing, in which:

Figure 1 is a view in perspective of the operating mechanism of an instrument built in accordance with my invention, and Fig. 2 is a side elevation of the instrument as shown in Fig. 1.

Referring to the drawing, the instrument shown therein comprises a stationary coil 1, a damping chamber member 2 forming the framework of the instrument and located within the coil 1, a movable coil 3 pivotally mounted within the member 2 and a pointer 4 carried by the movable coil 3.

In my preferred embodiment, a single coil 1 made up of a frame 5 carrying conducting windings 6 is employed, although obviously a pair of stationary coils such as are found in the usual dynamometer type instrument may be substituted therefor. The single coil presents the advantage that a more even scale distribution will result in addition to being more economical. On the other hand, when a split stationary coil is used the bearing and pointer assemblies may be located outside thereof permitting the movable coil to more closely correspond in size to and be magnetically linked more closely with the stationary units.

The damping chamber member 2 which forms the framework of the instrument is preferably moulded of non-metallic material with its exterior in a substantially cylindrical form except at the opposing sections 7 and 8 where it is reduced and flattened to fit snugly within the frame 5 of the stationary coil 1. Formed within the member 2 is a damping chamber 9 with its lower end closed as at 10 (Fig. 2). This damping chamber is substantially cylindrical except near the sections 7 and 8 of member 3 where integral supporting members 11 and 12 project inwardly and carry standards 13 and 14, respectively, which may also be integral with the members 11 and 12. A bridging member 15 also of nonmagnetic material is provided with a jewel or bearing member 16 in the center thereof, and is attached to the standards 13 and 14, as indicated. A second jewel or bearing member 17 (Fig. 2) is located in the bottom 10 of the member 2.

The moving coil, designated generally as 3, comprises a coil 18 of conductors wound in the shape of a rectangle slightly smaller than the dimensions of a cross-section of the cylindrical portion of the damping chamber 9. This conducting coil 18 is embedded in a solid vane 19 of light weight non-metallic material and its ends may be connected to the usual spring biasing leads (not shown). Secured to the vane 19 in any suitable manner are pointed trunnions 22 and 23 cooperating with the bearing members 16 and 17 to pivotally support the entire coil assembly. Indicated at 24 is a portion of a cover of non-magnetic material for closing the chamber 9.

The pointer 4 is rigidly secured to the upper trunnion 22 so as to indicate the position of the movable coil 3.

From the foregoing description, it will become obvious that since the movable coil 3 is in the form of a vane confined within the enclosed chamber 9, its motion and that of the pointer 4 may be properly damped without using the additional damping equipment required in the prior art.

Although I have shown and described certain specific embodiments of my invention, I am fully aware that many modifications thereof are possible. My invention, therefore, is not to be restricted except insofar as is necessitated by the prior art and by the spirit of the appended claim.

I claim as my invention:

In a dynamometer type measuring instrument, a unitary current conducting coil for producing a magnetic field, a damping member of non-conducting material removably disposed within said stationary coil and defining an open top damping chamber with oppositely disposed thickened wall portions extending therein to form damping baffles, a first bearing disposed in the bottom of said damping member, a second bearing, a pair of standards projecting from the thickened wall portion of said damping member to support said second bearing opposite said first bearing at a position spaced outwardly from the open top of said damping chamber, a damping vane of non-conducting material having trunnions extending therefrom for engaging said bearings to movably support it within said damping chamber, a second current conducting coil embedded in said damping vane within the magnetic field produced by said stationary coil, an indicating member secured to the upper of said trunnions, and means for closing the top of said damping chamber.

UEL L. SMITH.